(12) United States Patent
Aumueller et al.

(10) Patent No.: US 9,278,493 B2
(45) Date of Patent: Mar. 8, 2016

(54) SYSTEM AND METHOD FOR PRODUCING CONVEYOR BELTS HAVING A WIRE ROPE CORE

(75) Inventors: Steffen Aumueller, Neuss (DE); Gerhard Hirschka, Willich (DE); Axel Weiss, Willich (DE)

(73) Assignee: SIEMPELKAMP MASCHINEN—UND ANLAGENBAU GMBH, Krefeld (DE)

( * ) Notice: Subject to any disclaimer, the term of this patent is extended or adjusted under 35 U.S.C. 154(b) by 697 days.

(21) Appl. No.: 13/521,675

(22) PCT Filed: Feb. 17, 2011

(86) PCT No.: PCT/EP2011/052357
§ 371 (c)(1),
(2), (4) Date: Sep. 14, 2012

(87) PCT Pub. No.: WO2011/101410
PCT Pub. Date: Aug. 25, 2011

(65) Prior Publication Data
US 2013/0098525 A1    Apr. 25, 2013

(30) Foreign Application Priority Data

Feb. 18, 2010  (DE) .......................... 10 2010 008 531
Oct. 5, 2010  (DE) .......................... 10 2010 037 986

(51) Int. Cl.
*B29D 29/06*    (2006.01)
*B29C 43/28*    (2006.01)
*B65H 57/14*    (2006.01)
*B65H 57/16*    (2006.01)
*B65H 59/02*    (2006.01)
*B65H 59/40*    (2006.01)
*B29C 70/50*    (2006.01)
(Continued)

(52) U.S. Cl.
CPC ............... *B29D 29/06* (2013.01); *B29C 43/28*
(2013.01); *B65H 57/14* (2013.01); *B65H 57/16*
(2013.01); *B65H 59/02* (2013.01); *B65H 59/40*
(2013.01); *B29C 70/50* (2013.01); *B29C 70/56*
(2013.01); *B29K 2021/00* (2013.01)

(58) Field of Classification Search
CPC ........ B29D 29/06; B29C 43/28; B29C 70/50;
B29C 70/56; B65H 59/02; B65H 59/18;
B65H 59/40
See application file for complete search history.

(56) References Cited

U.S. PATENT DOCUMENTS 2,740,459 A * 4/1956 Suloff et al. ................... 156/178
3,345,229 A * 10/1967 Harpfer ......................... 156/166
(Continued)

FOREIGN PATENT DOCUMENTS

DE       19828736 A    5/2000

*Primary Examiner* — James Mackey
(74) *Attorney, Agent, or Firm* — Andrew Wilford

(57) ABSTRACT

The invention relates to a system for producing conveyor belts having a rope core, for example a wire rope core, comprising at least one rope unwinding unit having a plurality of rope reels, from which the ropes to be embedded in the conveyor belt are unwound, a combining unit in which the ropes, which are under tensile stress and run in the longitudinal belt direction parallel to one another in one plane, are combined with one or more raw rubber webs to form a raw belt, and a vulcanization press in which the raw belt is vulcanized by means of pressure and/or heat forming the conveyor belt. Said system is characterized in that the rope unwinding unit is designed as a rope unwinding and tensioning unit, in which each rope is individually tensioned to the required production tension.

22 Claims, 11 Drawing Sheets

(51) Int. Cl.
   *B29C 70/56* (2006.01)
   *B29K 21/00* (2006.01)

(56) References Cited

U.S. PATENT DOCUMENTS

| | | | |
|---|---|---|---|
| 3,348,585 A * | 10/1967 | Post et al. | 140/147 |
| 3,502,535 A * | 3/1970 | Bongers et al. | 156/494 |
| 3,616,496 A * | 11/1971 | Anglioetti et al. | 425/113 |
| 3,687,394 A | 8/1972 | Neumeister | |
| 3,793,118 A * | 2/1974 | Gilles et al. | 156/436 |
| 3,941,637 A | 3/1976 | Masuda | |
| 4,368,014 A | 1/1983 | Moitzfeld | |
| 2005/0034805 A1 | 2/2005 | Spangler | |
| 2009/0102402 A1 | 4/2009 | Jiang | |

* cited by examiner

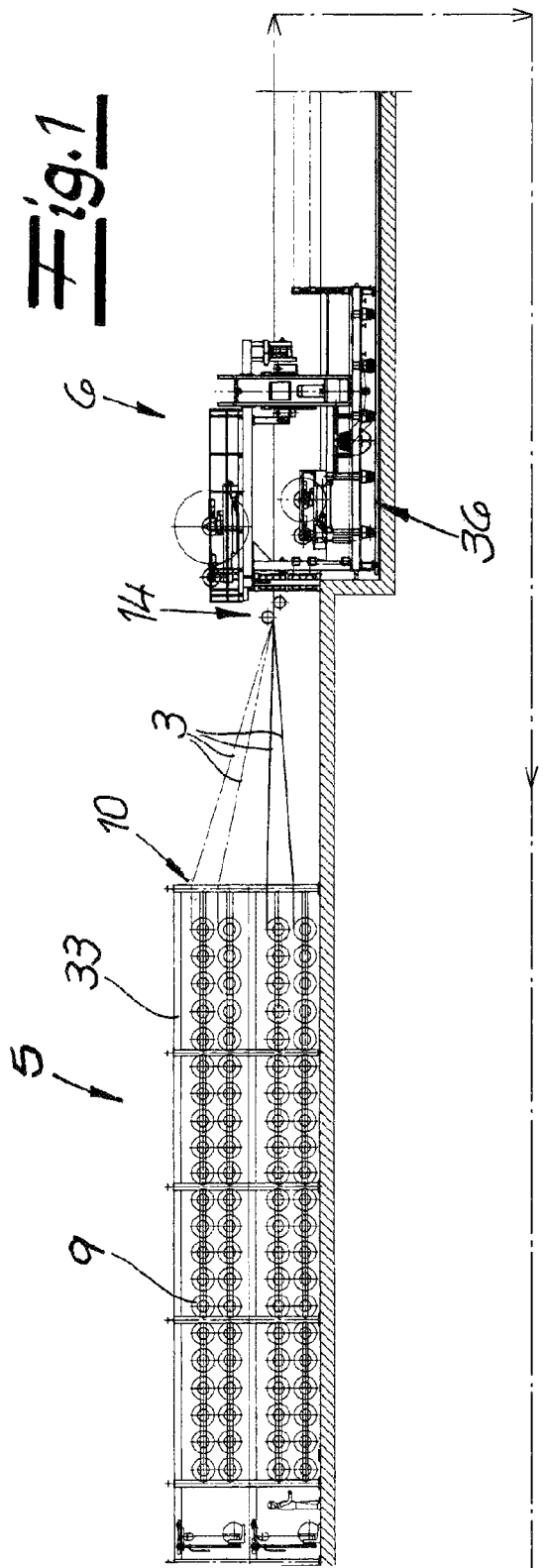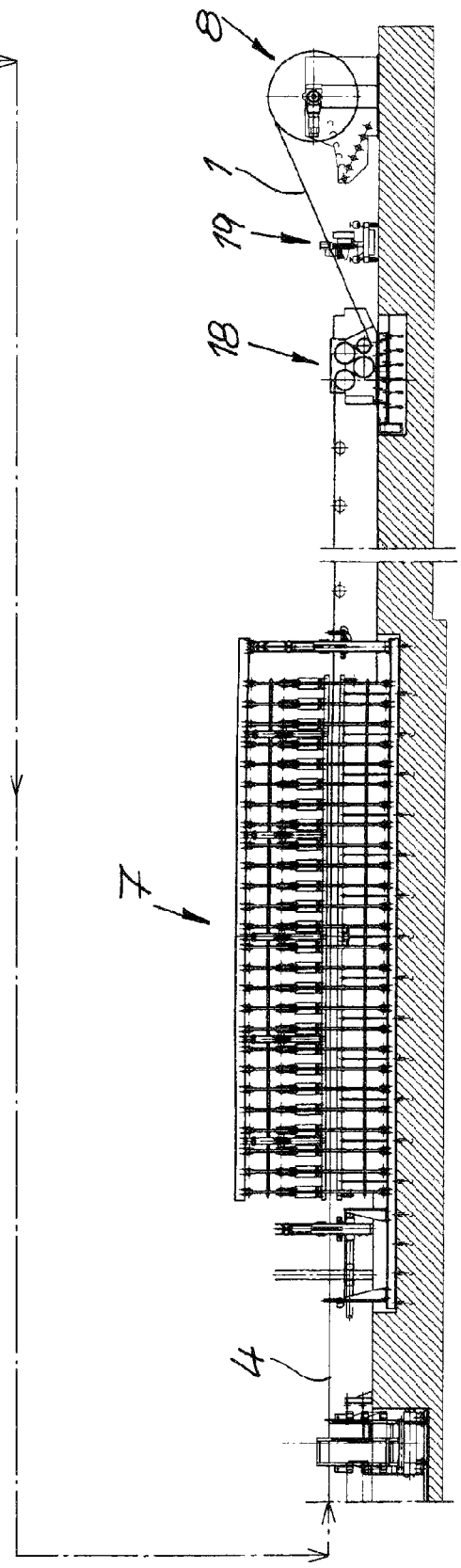
Fig.1

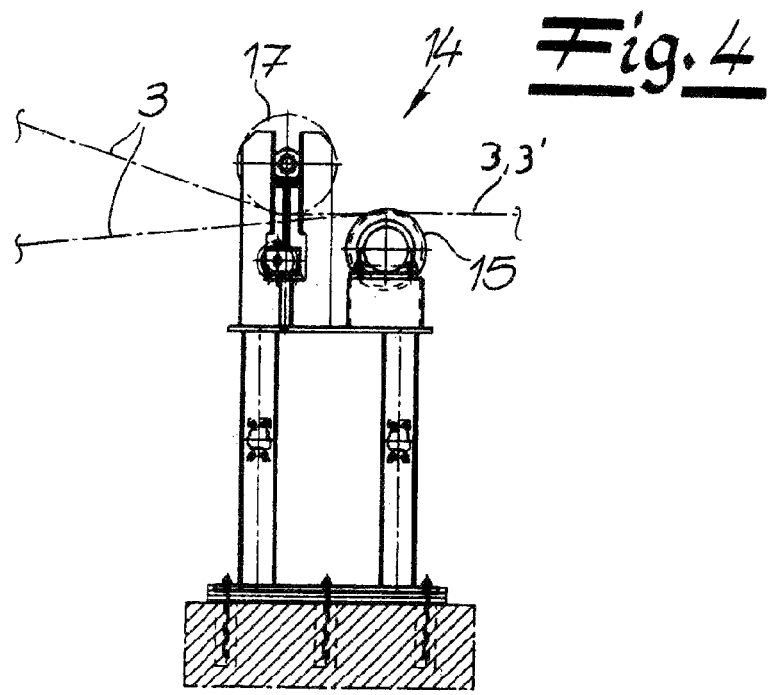
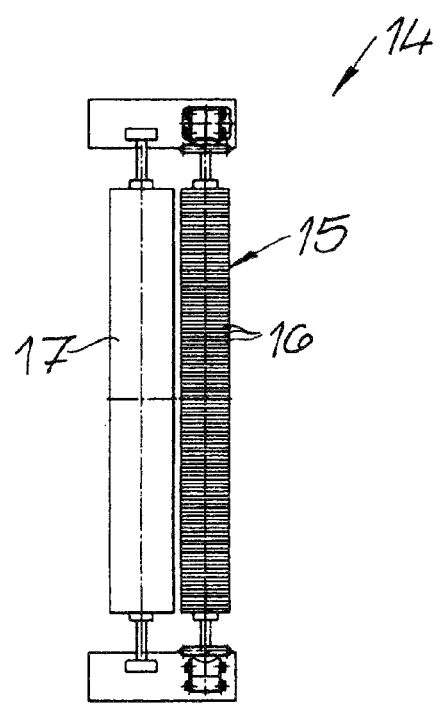

ism and Method for Producing Conveyor Belts Having a Wire Rope Core

CROSS REFERENCE TO RELATED APPLICATIONS

This application is the US-national stage of PCT application PCT/EP2011/052357 filed 17 Feb. 2011, published 25 Aug. 2011 as WO2011/101410, and claiming the priority of German patent application 102010008531.6 itself filed 18 Feb. 2010 and German patent application 102010037986.7 itself filed 5 Oct. 2010.

FIELD OF THE INVENTION

The invention relates to an apparatus for making a conveyor belt having a cable core, of steel for example, having at least a cable unwinder having a plurality of cable spools from which the cables to be embedded in the conveyor belt are unwound, a combining device or coater in which the cables, which are under tension and extend longitudinally of the belt parallel to one another in a plane, are combined with one or more raw rubber webs to form a raw belt, and a vulcanizing press in which the raw belt is vulcanized by pressure and/or heat to form the conveyor belt.

BACKGROUND OF THE INVENTIONS

Within the scope of the invention, "cables" refer to tension-withstanding strands that are or become embedded in the conveyor belts as reinforcing cables and that are generally made of twisted wires or fibers. The cables extend longitudinally of the conveyor belt and are preferably steel cables. However, the invention also encompasses other types of cables, for example cables made of synthetic fibers or polymeric fibers (for example, aramid fibers or polypropylene fibers), carbon fibers, or mineral fibers.

In the course of making a conveyor belt, i.e. conveyor belts made of rubber with a cable core or a steel-cable core, a plurality of cables or steel cables is unwound from respective cable spools in a cable unwinding station, also referred to as the spool rack, and the individual cables are subsequently oriented so that they extend longitudinally of the belt and parallel to one another in a plane to form a "cable mat" that is then combined with the raw rubber webs in the combining device or coater. The cables are under a predefined tension during the combining and also during the subsequent pressing or vulcanizing.

In an apparatus known from DE 30 37 61 [U.S. Pat. No. 4,368,014] for making a conveyor belt having a steel-cable core of the type described above, a cable tensioner having a cable clamp is provided between the cable unwinder and the combining device, which in the cited document is referred to as a coating station. A clamping pull-through device is downstream of the vulcanizing press. The vulcanizing press is designed as a batch press, and the coater also operates cyclically. In the known device, the required tension of the steel cables is created with the aid of the cable tensioner, with the apparatus not in operation. After a conveyor belt section has been produced with the aid of the hot vulcanizing press, the press is opened, and with the cable tensioner relaxed and the cable clamp open, the conveyor belt is advanced by the length of the previously vulcanized section of conveyor belt by activating the pull-through device, and at the same time a corresponding length of the finished conveyor belt is wound up in the winding station, the next segment of the conveyor belt blank to be vulcanized is drawn into the heated vulcanizing press, the coating station is advanced by a corresponding path length toward the hot vulcanizing press, and the steel cable is appropriately tightened by the steel cable spools via pinion rollers. To remove any slack in the steel cables, the motor in the spool rack is subsequently activated so that the steel cable spools are driven opposite the steel cable pay-out direction. The cable clamp, which is integrated into the cable tensioner, is then closed, and all the steel cable sections present between the pull-through device and the cable clamp are tensioned with the aid of the cable tensioner. In this tensioned state the steel cables are then coated with the raw rubber. In this type of apparatus it is then necessary to relax the cables once again after the coating in order to transport the raw belt into the press, where the cables must be retensioned.

To achieve proper running of the manufactured conveyor belts during subsequent operation, a uniform distribution of tension in all embedded reinforcing cables is particularly important. For this reason, it has been proposed in DE 198 28 736 to associate a measuring device, which ascertains the cable tension, with each reinforcing cable, the measuring device being connected via a process computer to a control or regulating mechanism, and the control mechanism operating on the particular tensioning unit bearing the tension roller.

The apparatuses of the type described above that are known in practice have basically proven to be satisfactory, but are capable of further development.

OBJECT OF THE INVENTION

The object of the invention is to provide an apparatus for making a conveyor belt having a cable core, a steel-cable core for example of the type described above, which with a simplified structural design allows the manufacture of high-quality conveyor belts.

SUMMARY OF THE INVENTION

To achieve this object, for a generic apparatus for making a conveyor belt having a cable core, a steel-cable core for example, the invention teaches that the cable unwinder is a cable unwinder and tensioner in which each cable is individually tensioned to the required production tension. For this purpose, the individual cable spools are each equipped with at least one tension actuator or drive by means of which the necessary tensioning torque is settable for producing the required production tension of the cable.

The invention is based, first, on the finding that the structural design of an apparatus for making a conveyor belt having a cable core, a steel-cable core for example, may be greatly simplified when the function of the cable unwinding station is expanded so that not only are the cables unwound and optionally tensioned to avoid slack, but also the required production tensions and therefore the desired belt tensions are set there. As a result, the separate cable-tensioning station having an integrated cable clamp provided in practice heretofore may be dispensed with, so that the overall design of the apparatus may be simplified and the apparatus may be reduced in length. The drives provided heretofore in the spool rack, which have applied a tensioning torque merely by avoiding slack, are replaced by powerful electric motors that are able to apply the necessary torques for creating the high cable tensions. These tension actuators are preferably designed as synchronous electric motors that are each preferably equipped with or connected to a respective frequency converter to allow targeted setting of the individual cable tensions. Dispensing with a conventional tensioner having a cable clamp has the additional advantage that tension may be developed and maintained during transport. Therefore, it is no longer necessary to temporarily relax the cables each time a certain section is further transported. Thus, continuous operation is possible.

To further increase the functionality of the apparatus and to further improve the quality of the manufactured conveyor belts, the invention proposes equipping the cable unwinder and tensioner with one or more cable-tension sensors that measure the tension of the individual cables, a separate measuring point preferably being associated with each cable. Accordingly, this cable-tension sensor is also preferably integrated into the cable unwinder, i.e. the novel cable unwinder and tensioner. It is thus possible to monitor the actual cable tensions in a targeted manner, and particularly preferably to integrate a cable tension control apparatus and/or cable tension regulation apparatus into the cable unwinder. For this purpose, the cable unwinder and tensioner is preferably equipped with a control and regulating device that is connected to the cable-tension sensors on the one hand and to the tension actuators or drives on the other hand. By monitoring and evaluating the cable tensions that are actually in the individual cables, it is possible to set a cable mat with exactly the desired production tensions on all individual cables, for example with the identical tension on all individual cables, or also a desired "nonhomogeneous" belt tension profile over the width of the conveyor belt, in particular without a separate cable-tensioning station between the cable unwinder and the combining station. The evaluation by the cable-tension sensors precisely sets the desired cable tensions over the cable spools or their drives, even if different tensions result from identical torques, depending on the unwinding diameter at the various cable drums.

By use of the cable unwinder and tensioner according to the invention, cable tensions of up to 4000 N per cable, for example, may be generated in a very targeted manner, in particular without a separate cable-tensioning station. Typical individual cable tensions or tensions are between 800 and 4000 N, as a function of the cable diameter. The cable diameter is, for example, 2 to 18 mm, preferably 2.5 to 15 mm.

The cable unwinder has, in a manner known per se, a cable unwinding frame in which the cable spools are rotatably mounted and driven via tension actuators. The invention proposes that the cable-tension sensor is integrated into the cable unwinding frame, for example at the exit-side end of the cable unwinding frame. Such a cable unwinding frame is generally equipped on the exit side with cable guide rollers that may be designed as pinion rollers. The invention proposes to integrate the cable-tension sensors in this region of the apparatus. For this purpose, the cable-tension sensors may be equipped with a plurality of measuring points, for example measuring probes that are each associated with a respective cable. These measuring probes may be formed, for example, by measuring disks or measuring rollers that each may be connected to a respective load cell.

The cable-tension sensors are particularly preferably designed like a cable triangle. They have at least two guide rollers one behind the other in the travel direction, between which the measuring probes press on the cables and engage by a specified extent. The restoring forces generated by the cables are then measured by the respective measuring probes. The guide rollers and the measuring probe, for example a measuring disk, are particularly preferably configured in a rigid geometry and therefore fixed, in particular in such a way that the cable running between the guide rollers is deflected by the measuring probe. The restoring force generated in the course of this deflection is measured with the aid of the measuring probe connected to a respective load cell, for example. The measured value generated in this manner is then used to control and/or regulate the cable tension as described above.

Motor/transmission combinations (in the sense of a drive) are generally used as tension actuators. To regulate the individual cable tensions, as described it is advantageous to equip the individual motors with respective frequency converters. Depending on the design of the motor-frequency converter combination, the measured value of the cable tension is transmitted directly to the motor and regulated in a decentralized manner, or is transmitted to a central PLC control apparatus, and the determined manipulated variables are relayed to the frequency converters of the individual motors. The regulation may be based on a set-point value that is predefined by the central PLC control apparatus.

A pull-through device is preferably downstream of the vulcanizing press, in particular when the latter is designed as a batch press. By means of the described unwinder and tensioner, the cables are then tensioned to the production tension between this cable unwinder and tensioner and the pull-through device.

An aligner having at least one spreader comb is generally between the cable unwinder and tensioner and the combining station in which the steel cables are combined with the raw rubber webs. This spreader comb is used to change the cable spacings, preferably decreasing the spacings, but also increasing them if necessary. The spreader comb is generally used to set the desired production spacings of the cables before the cables run into the combining station. This is because as a rule the individual cables upon exiting from the cable unwinder or the tensioner have a spacing that does not yet correspond to the desired production spacing. The production widths of the conveyor belts are usually less than the widths of the cable unwinders or tensioners, so that a "contraction" of the cable mat is necessary, which is achieved with the aid of the aligner. Such an aligner has a spreader comb. The spreader comb may be designed in the known manner as a solid steel strip having welded-on teeth, or as a strip having milled-in grooves. Since during the course of the constriction of the cable mat, the individual cables are deflected to varying degrees at the teeth, different frictional forces occur that result in a more or less pronounced change in the cable tension. The greater the deflection at the teeth of the comb, the greater the change in the cable tension. To avoid these changes in the belt tension during the deflection resulting in undesired influencing of the tensions of the individual cables in the course of the further production process, in one preferred refinement the invention proposes that the cable tension in the cable unwinding and tensioning station is set or regulated under the condition that the desired production tensions are provided by taking into account the change in the cable tension in the spreader comb downstream of the spreader comb. Accordingly, the invention relates not only to an apparatus, but also to a method of making a conveyor belt having a cable core, a steel-cable core for example, the cable tension of the individual cables being measured and regulated to a desired set-point value or set-point values, taking the measuring results in the cable unwinder and tensioner into account. The setting or regulation of the cable tensions in the cable unwinding frame is particularly preferably carried out, as described, taking into account the subsequent changes in tension in the aligner or in the spreader comb. If, for example, before the coating of the cable mat, for example coating a steel-cable mat with raw rubber, all cables or steel cables have an identical tension, a tension profile of the cable mat that is nonhomogeneous over the width is set in the cable unwinder and tensioner in a very targeted manner, taking the changes in the tension in the spreader comb into account. Alternatively, however, it is possible to set a nonhomogeneous profile of the cable tensions over the width of the cable mat in the region of the coating station in a very targeted manner. It may be desired to manufacture conveyor belts having nonhomogeneous cable tension. This is also easily possible with high accuracy, using the apparatus according to the invention and the method according to the invention.

Even though within the scope of the invention there is the option for compensating for the changes in tension in the region of the spreader comb by calculation and subsequently with the aid of the tensioners, it is possible to replace the conventional spreader comb having fixed teeth with a "friction-reducing" roller comb. Particulars are explained in the description of the figures.

The combining or coating station in which the cables or the cable mat is/are combined with the raw rubber webs may be designed, in a manner known per se, as a cyclically operating coating station having a finishing carriage that travels back and forth. Alternatively, however, a continuously operating combining device may be provided. In this regard, reference is made to the description of the figures.

Last, it is possible within the scope of the invention for the vulcanizing press to be designed in a manner known per se as a cyclically operating vulcanizing press. In that case, the predefined production tensions of the individual cables between the cable unwinding station on the one hand and the downstream pull-through device on the other hand are set when not operating, with the vulcanizing press open. However, the invention also encompasses embodiments having continuously operating vulcanizing presses. In this regard as well, reference is made to the description of the figures.

The cable unwinding station has a plurality of cable unwinders, each formed by a cable spool and a drive.

It is within the scope of the invention for the cable unwinding stations or their cable unwinders to use motor/transmission combinations as drives, having a standardized output shaft that may be designed as a spline shaft, a hollow shaft, or a fitted key shaft. The individual cable spools are supported on their own separate shafts or rotationally fixed on their own separate shafts, so that it is then necessary to rotationally connect the standardized output shaft to the spool shaft.

In one preferred alternative, however, the invention teaches that the cable spool is mounted directly on the output shaft integrated into the transmission and projecting therefrom. In this aspect, the invention is based on the discovery that the design of a cable unwinder may be optimized by not equipping the transmission with a standardized output shaft that is rotationally coupled to a spool shaft, that is then necessary. Instead, within the scope of the invention the output shaft of the transmission that projects from the transmission is now preferably directly used for supporting and driving the cable spool. Thus, the output shaft that projects from the transmission is adapted in such a way that the cable spool may be directly mounted on this output shaft. Taking into account the fact that a plurality of individual cable unwinders each equipped with a respective drive is provided in a cable unwinding station, in a manner of speaking a "customized" drive having an output shaft that is adapted to the intended purpose may be provided in a cost-effective manner, so that a separate spool shaft may be dispensed with. In this manner an extremely compact design is achieved, and the number of different parts required is minimized.

To this end, the invention proposes that the output shaft that is integrated into the transmission projects from the transmission by a specified length that preferably corresponds at least to the width of the cable spools or is greater than it. Thus, the output shaft that is integrated into the transmission is dimensioned in such a way that it stably holds the cable spools. This is also important because the cable spools are generally supported in the cable unwinding frame on only "one side."

By the use of powerful electric motor drives and suitable transmission, the cable unwinders according to the invention allow the necessary torques for creating high cable tensions to be applied in a particularly simple manner, so that the drives are designed as "genuine" tension actuators by means of which the required production tensions are actually applied.

To allow torques to be easily transmitted to the cable spool via the shaft, in a first embodiment the invention proposes that the output shaft is profiled, and for torque transmission engages for rotational coupling with a complementary recess in the cable spool in a positive-fit. Within the scope of the invention, a "profiled shaft" refers to a shaft that has a profiled cross section, and that therefore has a cross section that is not circular, for example a polygonal cross section. The spool recess has a complementary cross section, for example also a polygonal cross section, so that the output shaft is insertable for rotational coupling into the spool recess in a positive-fit. The cable spool may thus be easily detachably mounted on the output shaft, and torques may be easily and efficiently transmitted to the cable spool. The output shaft may be made of high-strength steel.

Alternatively, within the scope of a second embodiment the output shaft may be designed as an unprofiled smooth shaft. Within the scope of the invention, "unprofiled shaft" means that the shaft has a circular cross section. This output shaft having a circular cross section is preferably made of high-strength steel having a smooth surface. This embodiment is particularly suitable when operation is to be carried out using conventional cable spools having spool recesses or spool holes with a circular cross section. The cable spools mounted on these output shafts are also rotationally but detachably coupled to the output shafts. This is preferably carried out using a driver that is rotationally coupled or couplable to the output shaft. To avoid impairing the strength of the very rigid output shaft as the result of welded connections, for example, in one preferred refinement the invention proposes that the driver is force fitted on the output shaft by a tensioning element. Such a tensioning element may be designed as an annular tensioning element, for example.

Last, in order to allow the cable spool that has been pushed onto the output shaft to be rotationally but detachably coupled to the shaft with the aid of the driver, the driver may have one or more journals that are eccentrically arranged, for example eccentrically distributed around the shaft, and that engage with eccentric recesses in the cable spools. Conversely, however, it is also possible for the driver to have recesses, and the cable spool to have journals. In any case, the cable spool is coupled to the driver in a positive fit, the driver in turn being rotationally coupled to the shaft. This design with the aid of a driver also in particular allows the cable spools to be easily replaced.

The design having a driver is particularly suitable for embodiments in which the shaft has a circular cross section, so that conventional cable spools may be used. Alternatively, however, for a profiled shaft having a cross section that is not circular it is within the scope of the invention to also provide a driver, in a manner of speaking, for torque transmission.

It is within the scope of the invention that for securing the cable spool on the shaft, a securing element, for example a lock washer, is placed on the end of the shaft after the cable spool has been mounted on the shaft. Such a securing element, for example a lock washer, may be secured by a pin or a spring. Optionally or additionally, it is within the scope of the invention for the journal and/or the recesses to have a conical design, and to have a cross section that increases with increasing depth. Such a conical design has the advantage that during operation, due to force deflection, the cable spool is pulled toward the driver by itself, in a manner of speaking, and thus locked. In that case, it may be possible to dispense with additional securing elements such as lock washers, for example. The replacement of the cable spool is further simplified by these measures, since loosening of lock washers or the like may be dispensed with.

A cable unwinding station, which is also referred to as a spool rack, is equipped with a cable unwinding frame and a plurality of cable unwinders of the described type on the cable unwinding frame. A plurality of cable unwinders more than 100 cable unwinders, preferably than 200 cable unwinders, optionally more than 300 cable unwinders, may be integrated into the cable unwinding frame. The described advantages due to simplifying the cable unwinders result in particular when a particularly large number of cable unwinders each having its own drive is integrated into one apparatus. It is then possible to produce and make available in a particularly cost-effective manner a transmission having a suitable output shaft that is specifically matched to the requirements. Within the scope of the invention, such a cable unwinding station may be easily and inexpensively constructed since it is formed by only a few components. The cable-unwinding station is composed essentially of a relatively simple steel structure as well as the motor/transmission units according to the invention and the corresponding spools.

BRIEF DESCRIPTION OF THE DRAWING

The invention is explained in greater detail below with reference to drawings that illustrate illustrated embodiments strictly [by way of example]. Therein:

FIG. 1 is a schematic side view of an apparatus for making a conveyor belt having a steel-cable core, FIG. 4 is a large-scale view of a detail of FIG. 1 in the region of an aligner, FIG. 5 shows the structure of FIG. 4 in another view.

SPECIFIC DESCRIPTION OF THE INVENTION

Figure 2:
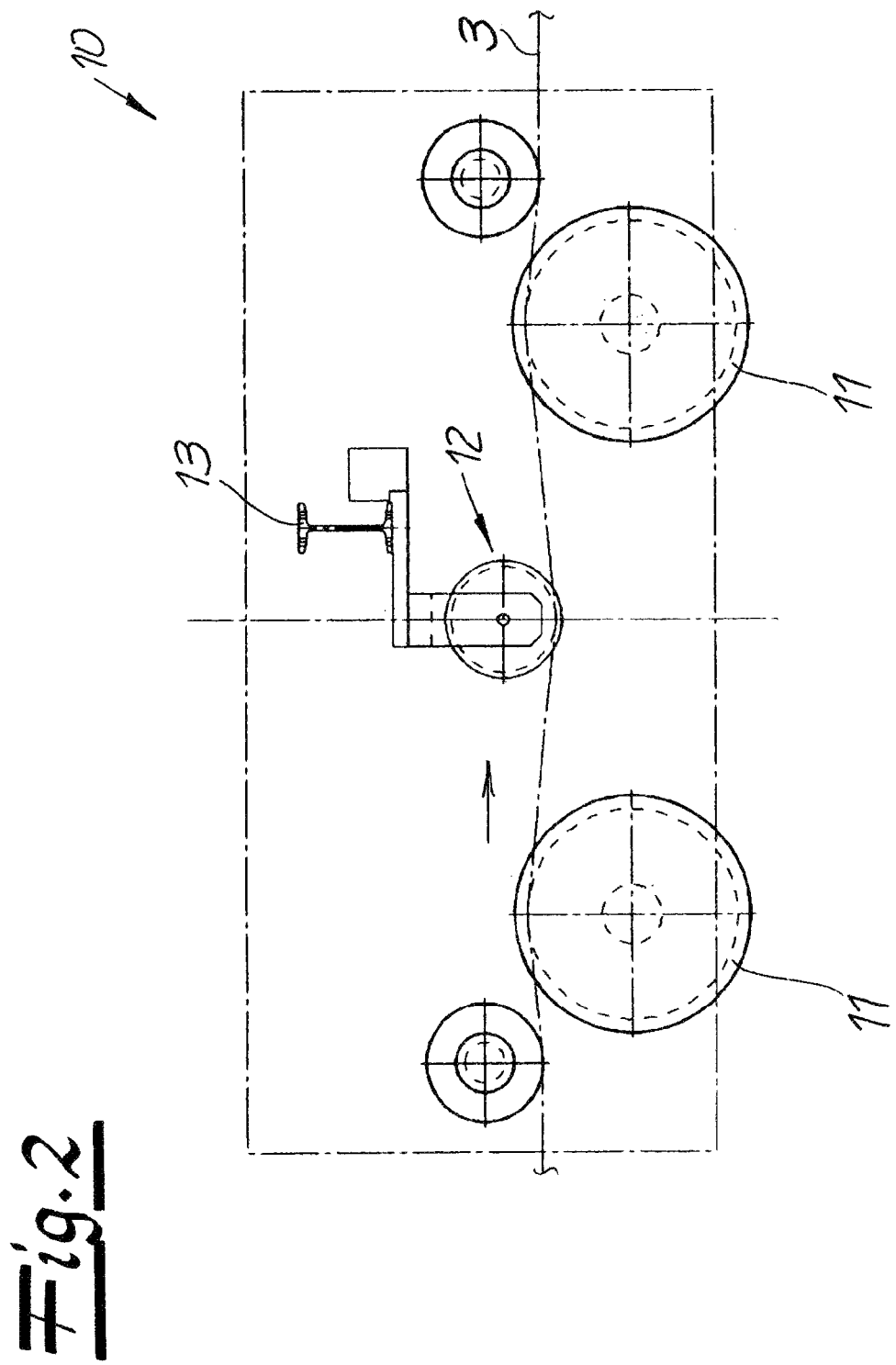
FIG. 2 is a large-scale view of a detail of the apparatus according to FIG. 1 in the region of a tension sensor.

The figures illustrate an apparatus for making a conveyor belt 1 having a cable core, in particular a steel-cable core. These types of conveyor belts 1 are generally made of at least two raw rubber webs 2, between which is embedded a cable or steel-cable mat formed by a plurality of cables or steel cables 3 extending longitudinally of the belt parallel to one another in a plane. The individual steel cables 3 are prestressed with a predetermined tension, and are therefore under a predefined belt tension. The individual steel cables 3 extending in a plane collectively form a cable mat 3'.

In its basic design, the apparatus has a cable unwinder 5, a combining device 6, a vulcanizing press 7, and at least one rewinder 8.

The cable unwinder 5 has a plurality of rotatably supported cable spools 9 from which the cables 3 to be embedded in the conveyor belt 1 are unwound.

The steel cables 3, i.e. the steel-cable mat 3', under tension and extending longitudinally of the belt parallel to one another in a plane, is/are combined with the raw rubber webs 2 in the combining device 6 to form a raw belt 4.

The raw belt 4 is subsequently vulcanized in the vulcanizing press 7 by pressure and heat to form the conveyor belt 1.

The apparatus illustrated in FIG. 1 operates cyclically; i.e. the combining device 6 as well as the vulcanizing device 7 operate in cycles as explained in greater detail below.

Whereas in the prior art, heretofore a tensioner has been provided between the cable unwinder 5 and the combining device 6, which is also referred to as a coating station, within the scope of the invention the cable unwinder is now designed as a combined cable unwinder and tensioner 5. Each cable 3 is individually tensioned to the required production tension in this cable unwinder and tensioner 5. For this purpose, the individual cable spools 9 are each equipped with a separate tension actuator (not illustrated in FIGS. 1 through 10), which now, however, is used not only to avoid slack in the cable during unwinding, but also to set the necessary tensioning torque for producing the required production tension of the cable. These tension actuators may be designed as synchronous electric motors that are each equipped with or connected to a frequency converter. Particulars are explained below in conjunction with FIGS. 11 through 13.

To allow the desired cable tensions of the individual cables to be not only set but also monitored, the cable unwinder and tensioner is equipped with one or more cable-tension sensors 10 for measuring all the individual cable tensions. For this purpose, each cable-tension sensor 10 has at least measuring point 12 associated with each cable 3. As a result, all tensions of the individual cables may be individually measured and evaluated. This measuring device 10 is merely indicated in FIG. 1. The design and mode of operation of this measuring device 10 are explained with reference to FIGS. 2 and 3.

Figure 3:
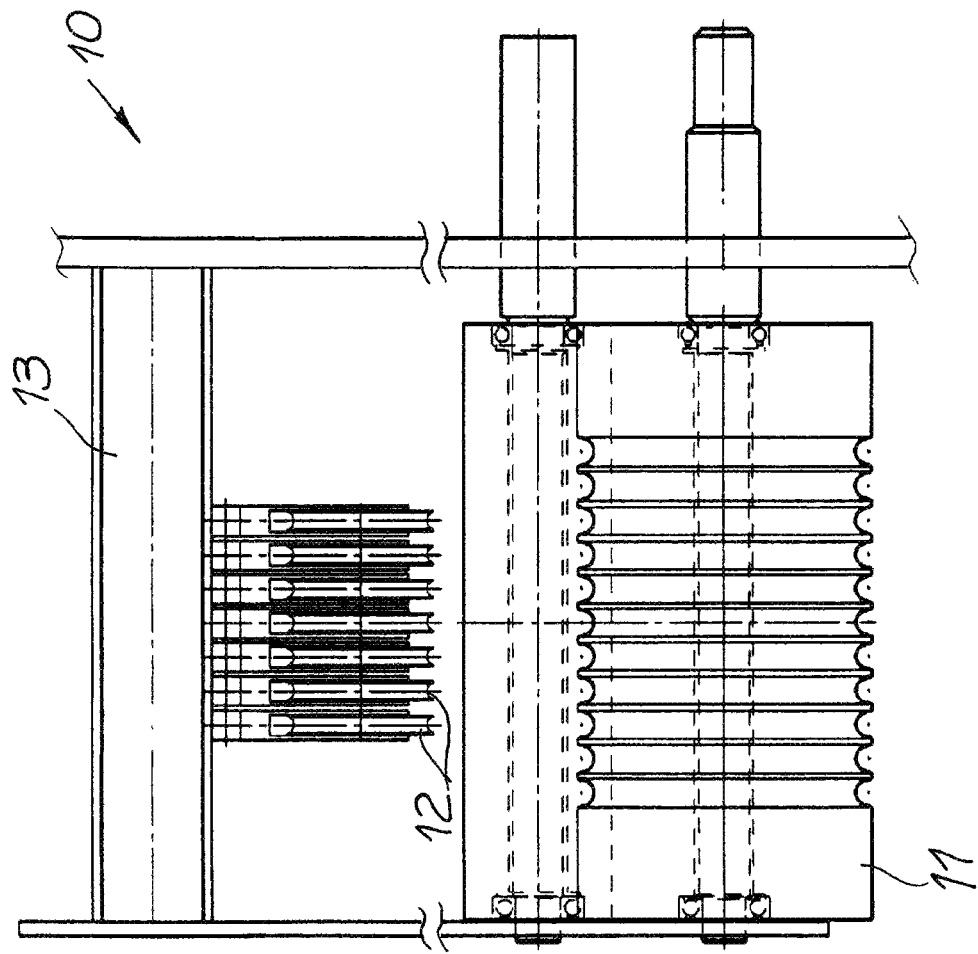
FIG. 3 shows the structure of FIG. 2 in another view.

The cable unwinder and tensioner 5 has a frame 33 in which the spools 9 are rotatably supported. Since, as is apparent in FIG. 1, the individual spools 9 are provided in a plurality of tiers, and in addition a plurality of spools are next to one another, a plurality of respective cables 3 in a plurality of groups are initially discharged from the cable unwinding station. An individual cable-tension sensor 10 may be associated with each of these groups. Such a cable-tension sensor 10 is illustrated in FIGS. 2 and 3 by way of example. Each cable-tension sensor 10 has a plurality of measuring points 12 that are designed like a cable triangle. The cable-tension sensors each have two guide rollers 11 one downstream of the other in the transport direction, between each of which a plurality of measuring probes 12 associated with the individual cables 3 are provided as measuring points. The geometry of this cable triangle is such that the measuring probes 12 engage by a specified extent between the guide rollers 11, and thus press on the cables. A separate load cell (not illustrated) by means of which the restoring forces generated by the particular cable 3 are measurable is associated with each measuring probe 12. The guide rollers 11 illustrated in FIGS. 2 and 3 are stationarily integrated into the apparatus, and therefore are stationarily integrated into the cable unwinding frame or connected thereto. The individual measuring probes 12 are designed as rotatable measuring disks 12 that are suspended via the respective load cells on a shared support 13 that is also stationary. In the present context, "stationary" refers to during the measurement. Thus, it is also possible to displaceably mount the measuring probes or the support, for example for adjustment purposes. However, the support is fixed during the actual measurement. The geometry of the guide rollers 11 on the one hand and of the support 13 on the other hand, together with the measuring disks 12 connected thereto, thus defines the illustrated cable running geometry that generates a force that pushes transverse to the belt travel direction. The restoring forces generated in this way are now measured with the aid of the measuring probes 12 or their load cells. The measured values generated in this manner are used to regulate the cable tension, in particular with the aid of the previously mentioned control and regulating device (not illustrated). It is thus possible to precisely set and regulate all cable tensions in the desired manner so that high-quality conveyor belts may be produced. Since in practice the width of the cable unwinder and tensioner 5 is different, for example greater than the width of the conveyor belts 1 to be manufactured, and is therefore also greater than the width of the required cable mat 3', an aligner 14 is between the cable unwinder and tensioner 5 and the combining device 6 or coater, and has a spreader comb 15 that defines or approximately defines the production spacing between the cables. The design and mode of operation of such a spreader comb 15 can be seen by a comparative inspection of FIGS. 4, 5, 6, and 7.

Figure 6:
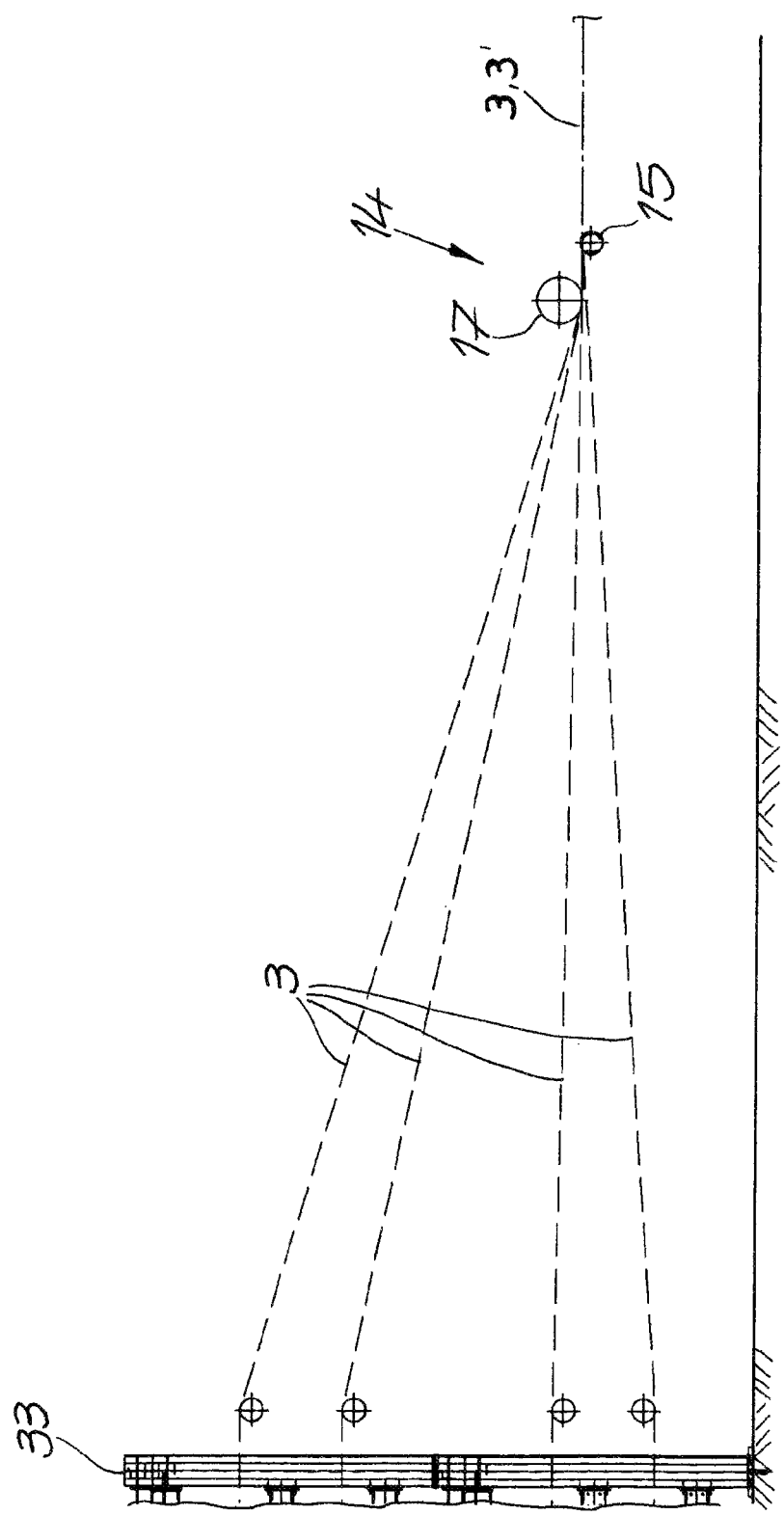
FIG. 6 is another large-scale view of a detail of the structure of FIG. 1.
Figure 7:
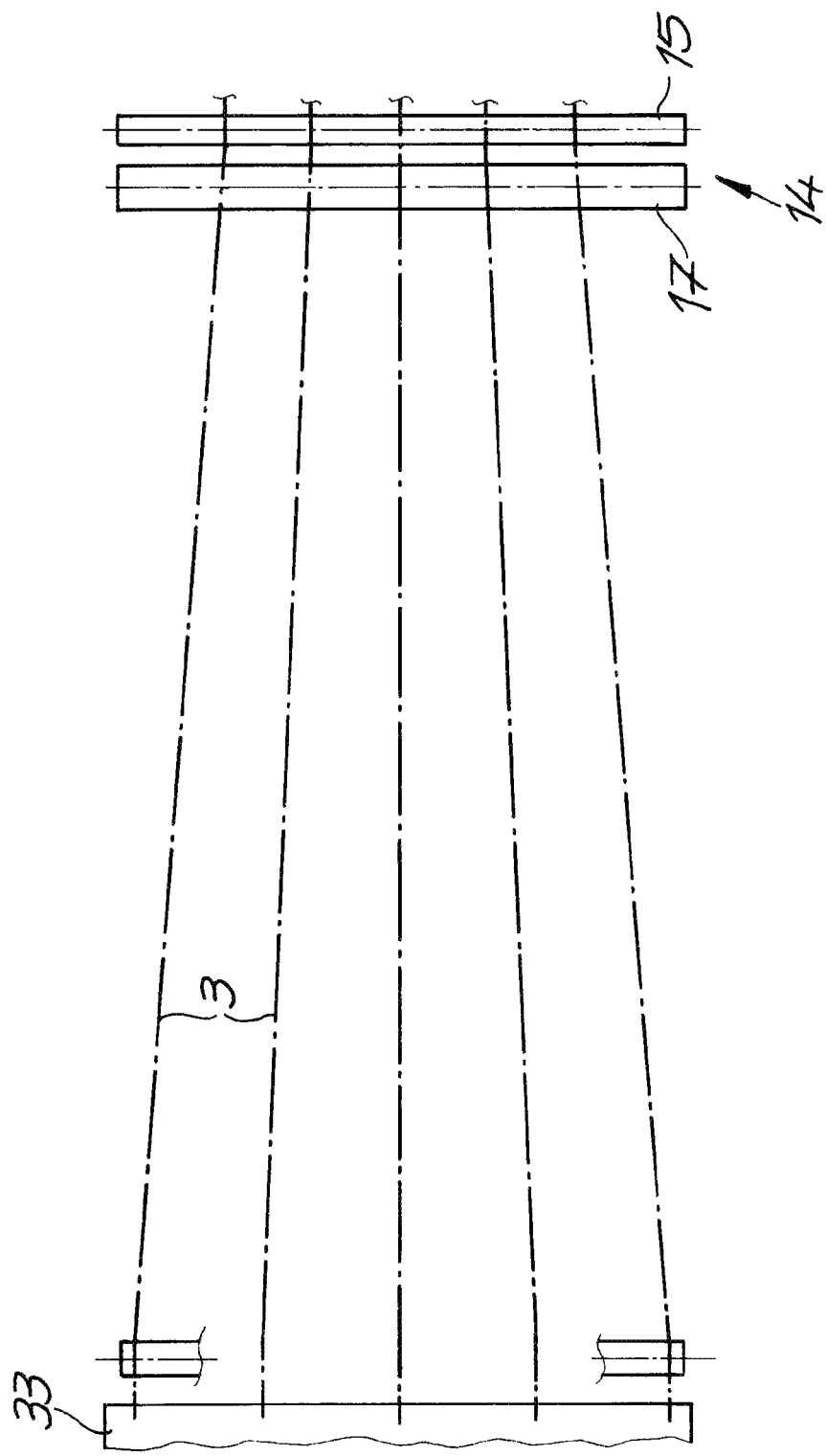
FIG. 7 is a top view of the structure of FIG. 6.

In the illustrated embodiment, the spreader comb 15 is designed as a rotatably supported roller comb 15 having circumferential guide grooves 16 that are parallel to one another over the outer periphery and that have a spacing that (approximately) corresponds to the production spacing. A guide roller 17 that ensures proper feeding of the cables that start from various planes in the cable unwinding station 5 is upstream of the roller comb 15. FIGS. 6 and 7 in particular show that the cable mat is constricted with the aid of this spreader comb 15. The roller comb may be formed by a rotatable roller core and a sleeve that has the grooves and that is pushed onto the roller core. Adaptation may be thus be made to various cable spacings by changing the sleeve (details not illustrated). As an alternative to such a roller comb 15, a conventional fixed comb having steel teeth may be used.

Regardless of the type of spreader comb 15, the individual cables are always deflected to varying degrees in the plane of the belt. This variation in deflection, in particular for an embodiment having a fixed comb with steel teeth, is associated with changes in the belt tension. As a result, the spreader comb 15 may change the tension distribution of the steel cables over the belt width in a nonhomogeneous manner, and may therefore distort it. Within the scope of the invention, this effect is compensated for in that the changes in the tensions, which are determined empirically, for example, in the region of the spreader comb 15 are taken into account in advance in setting the tension profile in the region of the cable-tensioning station 5. If, for example, a cable mat is to be produced with constant cable tension over the entire belt width, a nonhomogeneous tension profile is created in the region of the cable-tensioning station 5, taking the nonhomogeneous changes in the region of the spreader comb 15 into account in advance.

Therefore, the behavior of the steel cables in the region of the spreader comb is incorporated into the control.

In addition, it is apparent in FIG. 1 that downstream of the vulcanizing press 7 is a pull-through device 18 that draws the steel cables 3 and the finished conveyor belt 1 through the overall apparatus before the finished conveyor belt 1 is wound onto the downstream finished belt rewinder 8. A separator 19 may be provided between the pull-through device 18 and the finished belt rewinder 8.

As previously discussed, the apparatus illustrated in FIG. 1 operates cyclically. When, for example, a conveyor belt section has been finished in the vulcanizing press 7, the vulcanizing press 7 is opened and the finished belt 1 is advanced by the length of the previously vulcanized conveyor belt section by the pull-through device 18. At the same time, the next section of the raw belt to be vulcanized is thus drawn into the vulcanizing press 7. The combining device 6 is designed as a cyclically operating coater having a finishing carriage 36. In the course of advancing the finished belt section, the steel cables that have not yet been prepared have also been advanced by the corresponding length. Before this steel-cable mat is coated with the raw rubber webs 2 with the aid of the finishing carriage 19, the desired production tension must be applied to the steel cables. For this purpose, with the press 7 still open and the pull-through device 18 "fixed," the cable unwinding and tensioning station 5 applies the desired belt tension to the individual steel cables 3 and is adjusted to the desired set-point values as described. Thus, within the scope of the invention this takes place without a separate tensioning station. After the desired cable tensions are set, the cable mat is coated with the raw rubber webs 2 with the aid of the finishing carriage 19 and is rough-pressed in sections. At that point or afterward, the hot vulcanizing press 7 is closed and the raw belt section previously transported in is vulcanized. In any case, this coater 6 operates cyclically; i.e. the cables in the rest state are coated with the raw rubber by moving the raw belt unwinders back and forth by the carriage 36.

Figure 8:
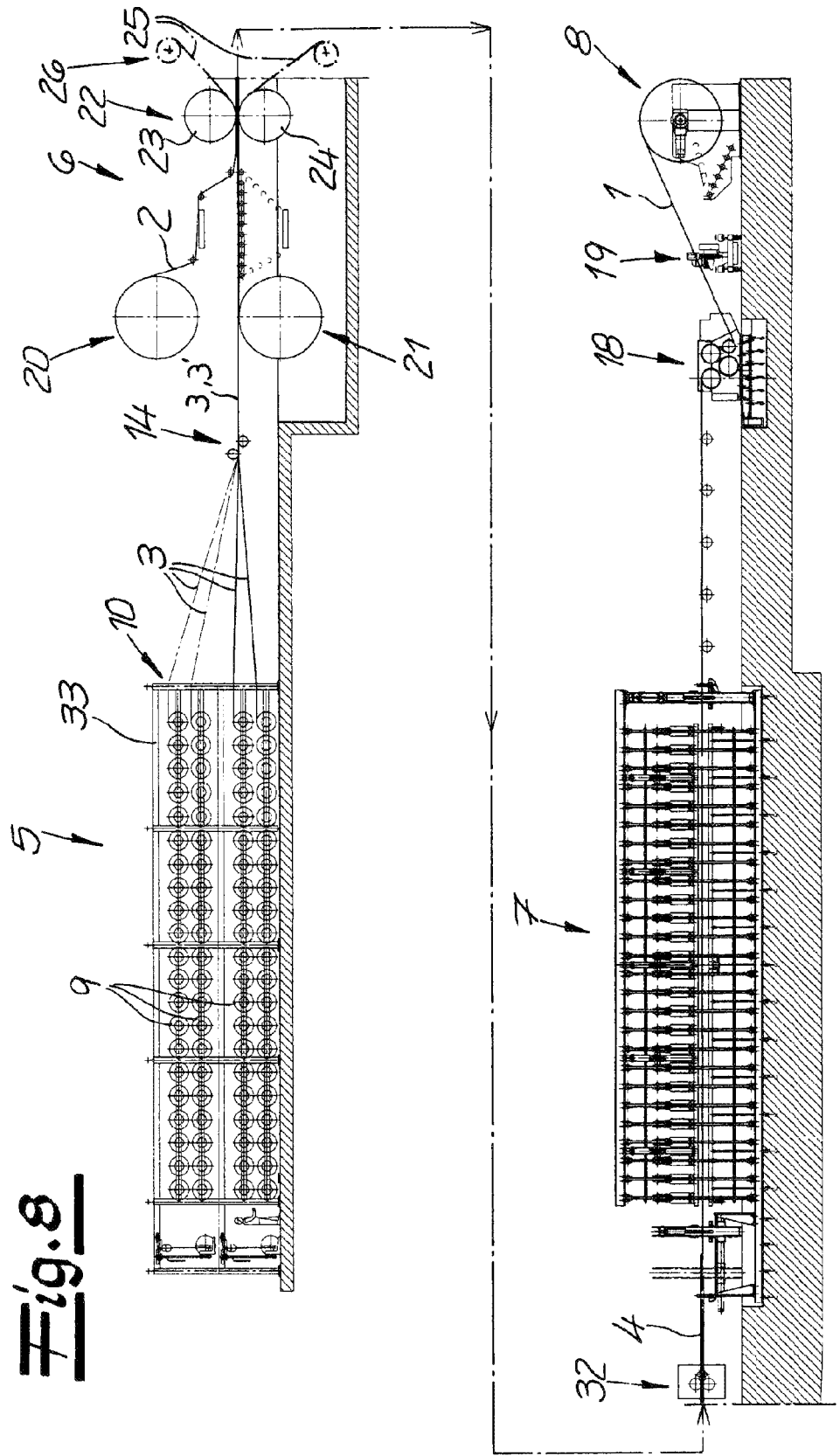
FIG. 8 is a view of a modified embodiment of the apparatus according to FIG. 1.

On the other hand, FIG. 8 shows a modified embodiment in which, although the vulcanizing press 7 is still designed as a batch press, the combining station 6 operates continuously. This means that during the transport of the steel cables 3, the raw rubber webs 2 are combined with the moving steel cables 3 in the combining station. For this purpose, the feed device 6 has a stationary unwinder 20 above the steel cables 3 for the upper raw rubber web 2, and a stationary unwinder 21 beneath the steel cables 3 for the bottom raw rubber web 2. At least one compressing device 22, by means of which the steel cables 3 are pressed against one another onto or into the raw rubber webs 2, is downstream of these unwinders 20, 21. In the illustrated embodiment, the compressing device 22 is designed as a calender-like roller device having an upper roller 23 and a bottom roller 24. Since the raw rubber webs 2 are generally coated with a separating film 25 and wound up, in the illustrated embodiment the combining device 6 is equipped with winders 26 for this separating film 25. These winders 26 (only indicated) are downstream of the compressing device 22 in the transport direction. In other respects, the apparatus according to FIG. 8 operates in the same way as the apparatus according to FIG. 1. A trimmer 32 may be between the coater 6 and the press 7.

Figure 9:
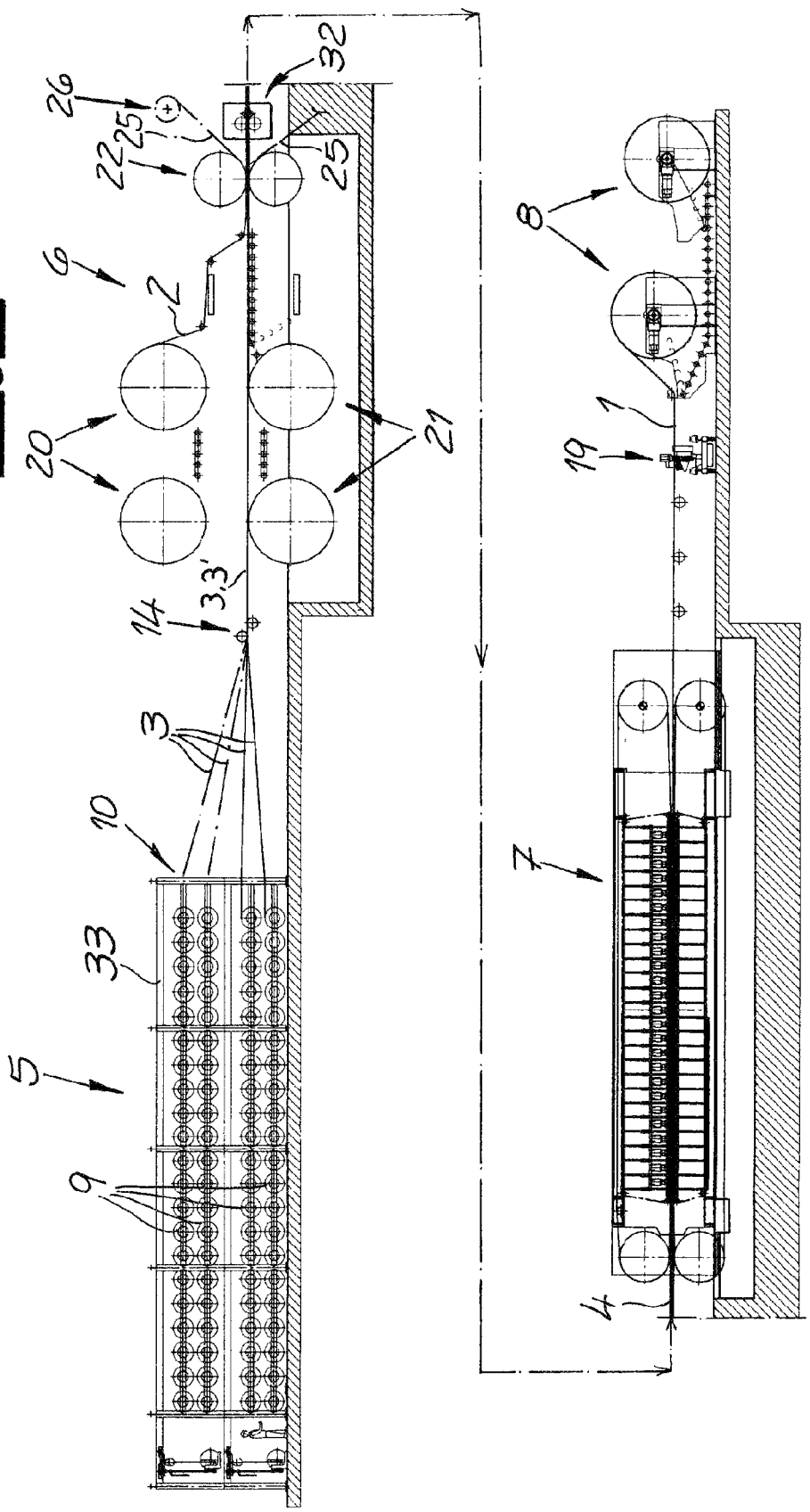
FIG. 9 shows yet another embodiment of the apparatus according to FIG. 1.
Figure 10:
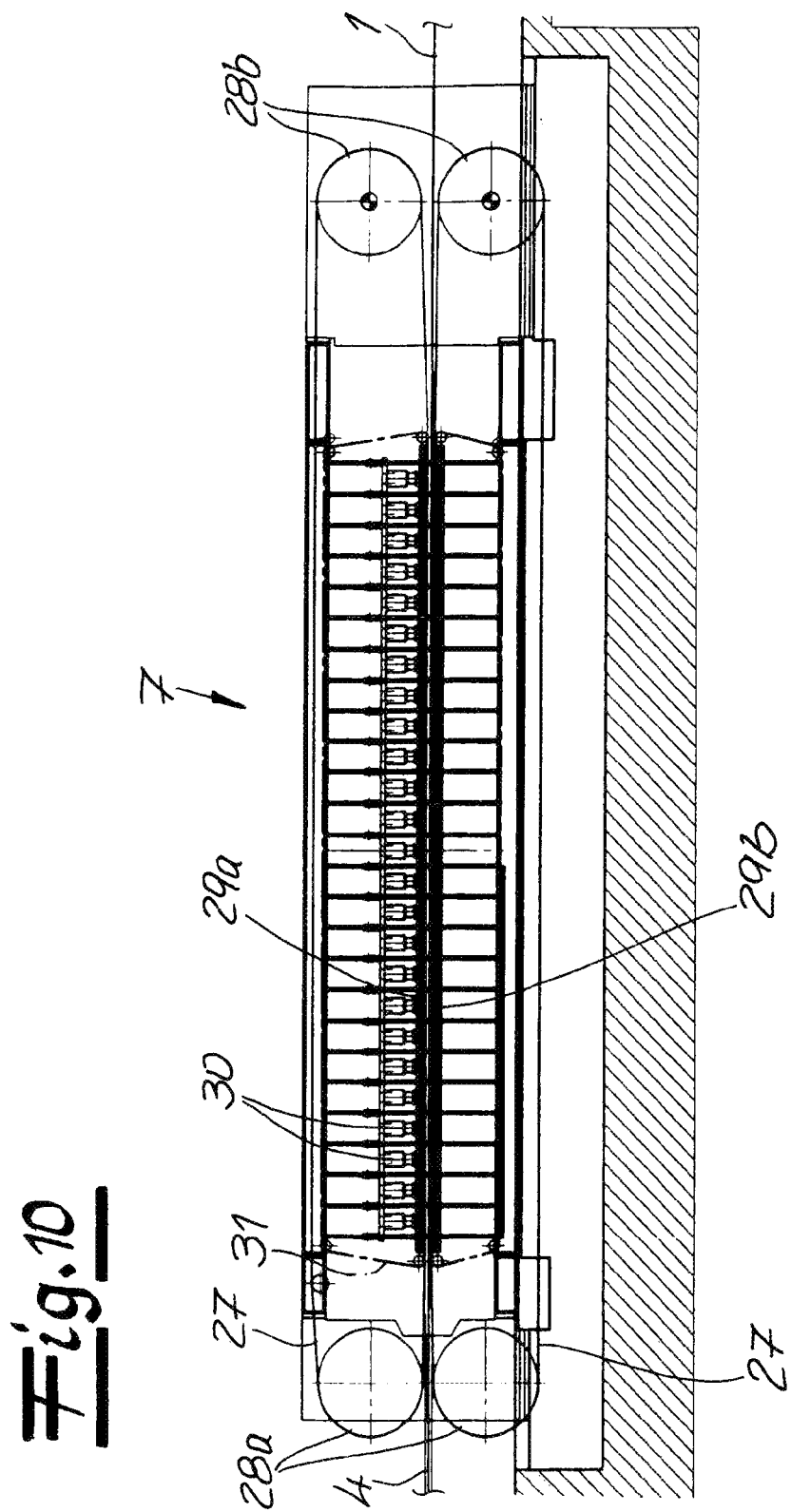
FIG. 10 is a large-scale view of a detail of the apparatus of FIG. 9.

In the modified embodiment according to FIG. 9, the vulcanizing press 7 is a continuously operating press. In the illustrated embodiment, the vulcanizing press is a double belt press having continuously circulating press belts 27 in the upper and lower parts of the press that are designed as steel belts, for example, and guided over deflection rollers 28a, 28b. In addition, upper and lower heatable press platens 29a, 29b are in the upper part and the lower part of the press, the upper press platen 29a and/or the bottom press platen 29b being acted on by hydraulic cylinder-piston units 30. In the illustrated embodiment, this is a downstroke press. The circulating press belts 27 are supported on the press platens 29a, 29b with roller assemblies 31, for example roller bars, connected in between. In the illustrated embodiment of FIG. 9, a separate pull-through device downstream of the press is dispensed with. The continuous press is thus designed in such a way that the steel cables 3 may be pulled through the apparatus with the required tension by the press belts 27. The cable unwinder and tensioner 5 thus sets the desired tensions of the individual cables 3 against the pulling continuous press 7. Continuous operation is thus possible with the aid of the apparatus illustrated in FIG. 9.

The apparatus illustrated in the figures has been explained using the example of making a conveyor belt having a steel-cable core. However, the explanations similarly apply for conveyor belts having other cable cores.

One advantageous refinement of the invention is explained with reference to FIGS. 11 through 13.

As previously discussed, the cable unwinding station 5 has a cable unwinding frame 33 and a plurality of cable unwinders 40 on the cable unwinding frame 33. Each cable unwinder 40 is essentially formed by a drive 41, 42 and a cable spool 9, the cables 3 to be embedded in the conveyor belt 1 being unwound by the individual cable spools 9 of the cable unwinders 40. The cable spools 9 are detachably connected to the drives 41, 42, and therefore are replaceable.

The drive 41, 42 has at least one motor 41 and at least one transmission 42. The transmission is equipped with an output shaft 47. The cable spool 9 is drivable with the aid of the drive 41, 42. It must be taken into account that the cables are pulled off or unwound, for example, from the cable spools 9 by the pull-through device 18 that is integrated into the apparatus, so that within the scope of the invention the drive 41, 42 is designed as a braking and/or tensioning unit that holds the cables 3 to be unwound under a predefined tension. As described, the required production tension of the cables is produced via the braking and/or tensioning units. The tensioning torques necessary for producing this required production tension of the cable may thus be set using the units 41, 42. The tensioning motors 41 are designed, for example, as synchronous electric motors that are each equipped with or connected to a respective frequency converter.

Figure 11:
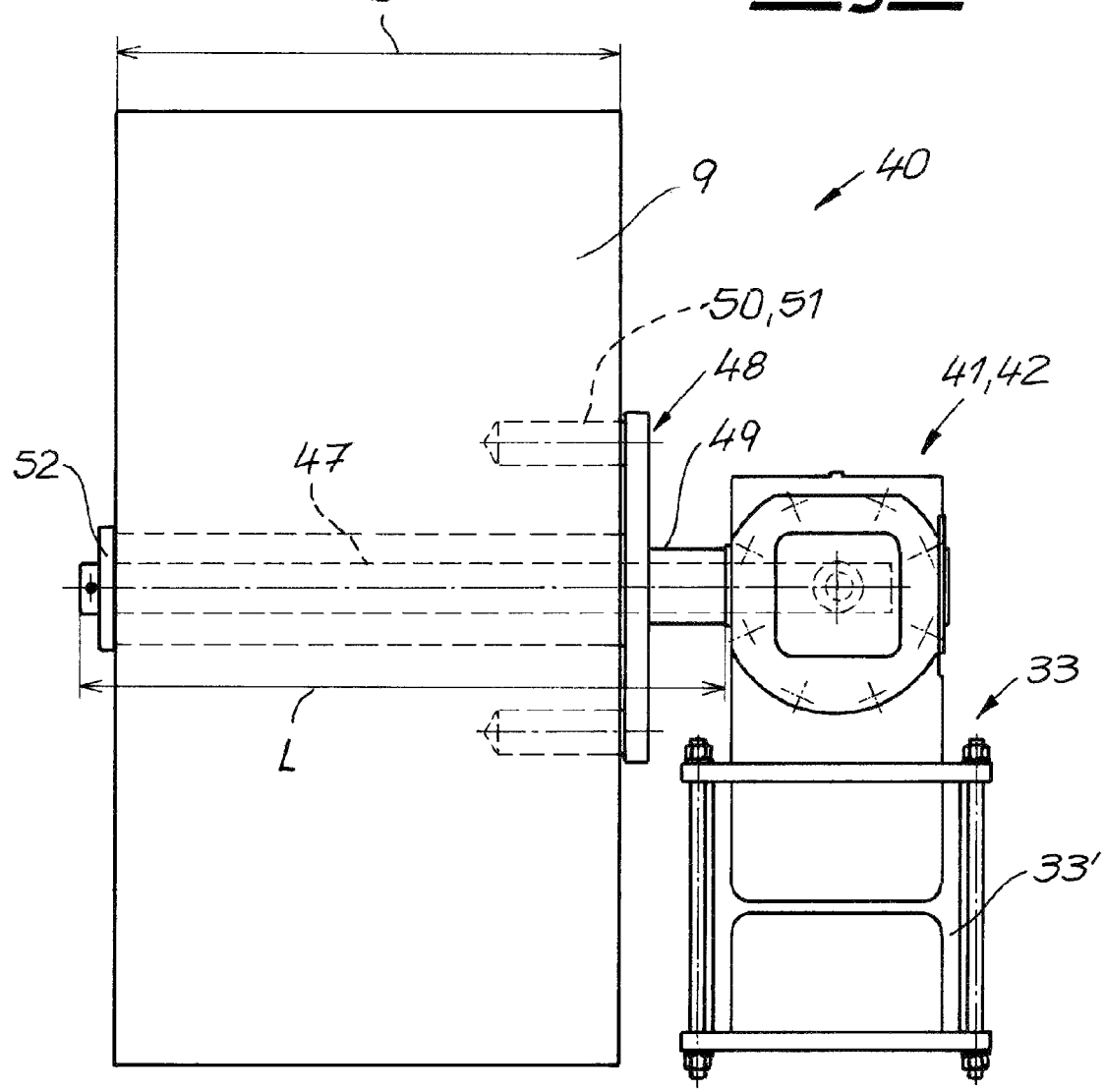
FIG. 11 shows a cable unwinder of the apparatus according to FIG. 1.
Figure 12:
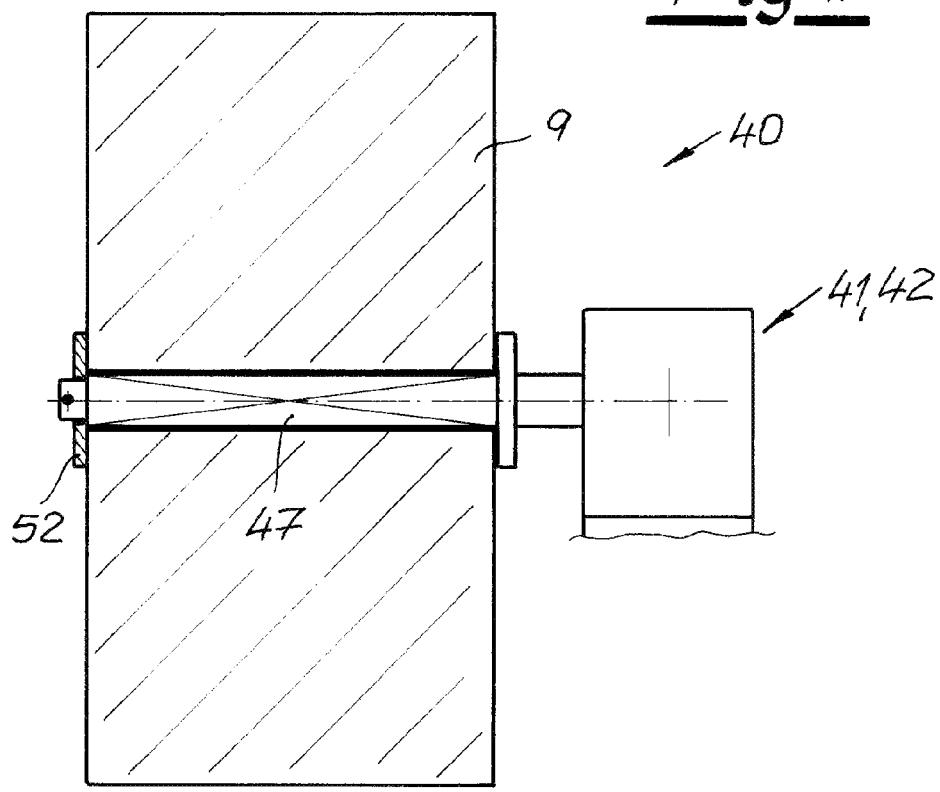
FIG. 12 shows a modified version of the structure of FIG. 11.
Figure 13:
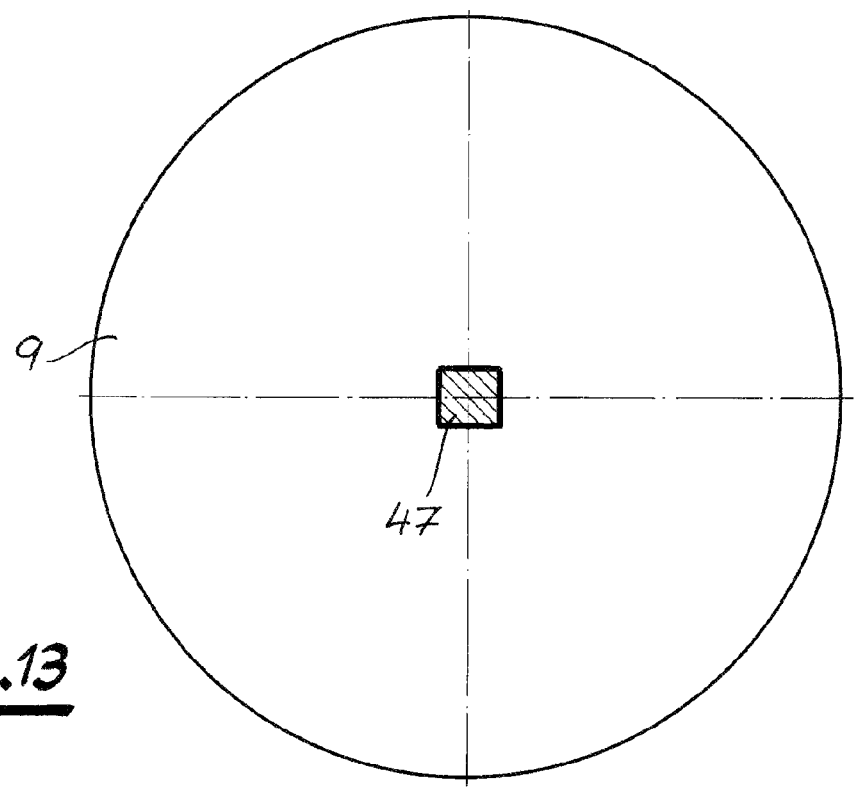
FIG. 13 is a cross section through the structure of FIG. 12.

According to the invention, the cable spool 9 of a cable unwinder 40, as illustrated in FIGS. 11 through 13, is now mounted directly on the output shaft 47 that is integrated into the transmission 42 and that projects therefrom.

FIG. 11 shows by way of example a longitudinal beam 33' of the cable unwinding frame 33 that extends in the working direction. The drive 41, 42 composed essentially of the motor 41 and the transmission 42 is mounted on this longitudinal beam 33'; the motor 41 itself is not illustrated in detail in FIGS. 11 and 12.

The output shaft 47 integrated into the transmission 42 projects from the transmission by a specified length L that is greater than the width B of the cable spool. This allows the cable spool 9 to be attached directly to the output shaft 47 that projects from the transmission without a separate spool shaft having to be rotationally fixed to a standardized output shaft of the transmission.

In the illustrated embodiment according to FIG. 11, the output shaft 47 is designed as an unprofiled smooth shaft made of high-strength steel having a smooth surface. This shaft has a circular cross section and engages with a spool recess that also has a circular cross section. To allow the cable spool 9 to be rotationally fixed to the output shaft 47 while still making it possible to easily replace the cable spool, a driver 48 is provided that on the one hand is rotationally fixed to the output shaft 47 and that on the other hand allows a detachable rotational coupling with the cable spool 9. The driver 48 is force fitted to the output shaft 47, for example via a tensioning element 49. This tensioning element 49 is illustrated in FIG. 11, but in simplified form. The tensioning element may be an annular tensioning element 49, for example.

To allow the individual cable spools 9 to now be rotationally coupled to the output shaft 47, in the illustrated embodiment the driver 48 has a plurality of eccentrically mounted journals 50 that engage with complementary recesses 51 in the cable spool that also are eccentric. High tensions or torques may be transmitted in this way, while still ensuring that the cable spool 9 may be easily replaced. As a result of the force-fit tension connection between the driver 48 and the output shaft 47, welded connections that could impair the strength of the output shaft 47 are avoided. The positive-fit connection between the cable spool 9 and the driver 48 allows the cable spool to be easily replaced.

In principle, it is within the scope of the invention that the cable spool 9 is secured axially by a securing element 52, for example a lock washer. Optionally or additionally, however, the journal 50 and/or the recess 51 may have a conical design and a depth that increases with increasing cross section. Such a design is not illustrated in the figures. This allows the securing element to be dispensed with if necessary. As a result of the conical design of the journal and/or recess, during operation the tensions are deflected in such a way that the cable spool is pulled toward the driver by itself, in a manner of speaking.

Overall, the cable unwinder 45 according to the invention is characterized by a simple and very compact design, since it is no longer necessary to connect a standardized output shaft of a standard transmission to a conventional spool shaft.

These advantages are also achieved in the modified embodiment of the invention illustrated in FIGS. 12 and 13. In this embodiment, the output shaft 47 is designed as a profiled shaft having a cross section that is not circular, namely, a polygonal cross section. In the illustrated embodiment, the output shaft 47 has a quadrilateral cross section, for example a square cross section. This profiled output shaft 47 engages with a complementary recess of the cable spool 9; i.e. this spool recess also has a cross section that is not circular, for example a polygonal cross section. In the illustrated embodiment, this cross section is also quadrilateral, namely, square. In this manner, for torque transmission the output shaft 47 engages with the spool recess in a rotationally fixed and positively fitted. It is thus possible to dispense with the arrangement having a driver, as illustrated in FIG. 11, for example, since torque transmission may be achieved directly via the output shaft 47. In this embodiment as well, it is advantageous to secure the cable spool 9 axially by a securing element 52 such as a lock washer, for example.

The invention claimed is:

1. An apparatus for making a conveyor belt having a cable core, having at least
a cable unwinder having a plurality of cable spools from which the cables, to be embedded in the conveyor belt are unwound,
a combining device in which the cables, which are under tension and extend longitudinally of the belt parallel to one another in a plane, are combined with one or more raw rubber webs to form a raw belt, a vulcanizing press in which the raw belt is vulcanized by pressure and/or heat to form the conveyor belt, the cable unwinder having a cable unwinder and tensioner in which each cable is individually tensioned to the required production tension, the individual cable spools each being with or connected to at least one tension actuator or tensioning drive that set a tensioning torque necessary for producing the required production tension of the cable, and at least one cable-tension sensor in the cable unwinder and tensioner for measuring tensions of the individual cables at one respective measuring point on each cable.

2. The apparatus according to claim 1, wherein the cable unwinder and tensioner is equipped with a control or regulation device that is connected to the cable-tension sensor or the measuring points on the one hand, and to the tension actuators on the other hand.

3. The apparatus according to claim 1, wherein the tension actuators are designed as synchronous electric motors or are equipped with synchronous electric motors that together or each are equipped with or connected to at least one frequency converter.

4. The apparatus according to claim 1, further comprising a cable unwinding frame in which the cable spools are rotatably mounted and driven via the tension actuators or drives, wherein the cable-tension sensor is integrated into the cable unwinding frame at an exit-side end of the cable unwinding frame.

5. The apparatus according to claim 1, wherein the measuring points are formed by measuring probes that are each associated with the respective cables.

6. The apparatus according to claim 5, wherein the measuring probes are designed as measuring disks or measuring rollers that are each connected to or equipped with a respective load cell.

7. The apparatus according to claim 5, wherein the cable-tension sensor has at least two guide rollers provided one downstream of the other in the transport direction and between which the measuring probe presses on the cables with a restoring force generated by the cables being measurable by the measuring probes.

8. The apparatus according to claim 1, having a pull-through device downstream of the vulcanizing press, wherein the cables are tensionable to the production tension between the cable unwinder and tensioner and the pull-through device by the cable unwinder and tensioner.

9. The apparatus according to claim 1, further comprising:
an aligner having at least one spreader comb that changes a cable spacing and between the cable unwinder and tensioner and the combining device, the individual cables being deflected by different angles in the plane of the belt by the spreader comb.

10. The apparatus according to claim 1, wherein each drive has at least one motor and at least one transmission having an output shaft, the cable spool being mounted directly on the output shaft that is integrated into the transmission and that projects from the transmission.

11. The apparatus according to claim 10, wherein the output shaft that is integrated into the transmission projects from the transmission by a specified length that corresponds at least to or is greater than a width of the cable spool.

12. The apparatus according to claim 10, wherein the output shaft is designed as a profiled shaft having a cross section that is not circular and for torque transmission engages with a complementary spool recess in the cable spool in a rotationally fixed in a positive fit.

13. The apparatus according to claim 10, wherein the output shaft is an unprofiled smooth shaft having a circular cross section made of high-strength steel having a smooth surface.

14. The apparatus according to claim 10, wherein the cable spool is mounted or rotationally fixed on the output shaft by a driver.

15. The apparatus according to claim 14, wherein the driver is force-fitted on the output shaft by an annular tensioning element.

16. The apparatus according to claim 14, wherein the cable spool is detachably attached to the driver in a positive-fit.

17. The apparatus according to claim 16, wherein the driver has one or more journals that are eccentrically distributed around the shaft, which extend axially and engage with eccentric recesses in the cable spool.

18. The apparatus according to claim 17, wherein the journals or the recess has/have a conical design, and has/have a cross section that increases with increasing depth.

19. The apparatus according to claim 10, wherein the motor is designed as an electric motor.

20. The apparatus according to claim 10, wherein the transmission is designed as a speed-reducing transmission.

21. A method of making a conveyor belt having a steel-cable core using an apparatus according to claim 1 wherein the cable tensions of the individual cables are measured, and are adjusted to a desired set-point value or set-point values taking the measuring results in the cable unwinder and tensioner into account.

22. The method according to claim 21, the cables being deflected to varying degrees in the plane of the belt in a spreader comb between the cable unwinder and the combining device by changing the cable tension of individual cables, wherein the cable tension in the cable unwinder and tensioner is set or regulated under the condition that the desired production tensions are provided by taking into account the changes in the cable tensions in the spreader comb downstream of the spreader comb.

* * * * *